F. LOEDIGE.
JOURNAL BOX LUBRICANT DEVICE.
APPLICATION FILED APR. 22, 1912.

1,051,244. Patented Jan. 21, 1913.

Witnesses:

Inventor:
Frederick Loedige

UNITED STATES PATENT OFFICE.

FREDERICK LOEDIGE, OF CHICAGO, ILLINOIS, ASSIGNOR OF ONE-HALF TO EVAN H. WADE, OF CHICAGO, ILLINOIS.

JOURNAL-BOX LUBRICANT DEVICE.

1,051,244. Specification of Letters Patent. Patented Jan. 21, 1913.

Application filed April 22, 1912. Serial No. 692,374.

*To all whom it may concern:*

Be it known that I, FREDERICK LOEDIGE, a citizen of the United States, residing at Chicago, in the county of Cook and State of Illinois, have invented a new and useful Improvement in Journal-Box Lubricant Devices, of which the following is a specification.

My invention is primarily an improvement on the journal-box lubricant device of my reissued Letters Patent No. 13,344, dated December 26, 1911, in which a holder for the lubricant in cake-form is spring-supported in the journal-box below the journal and tends to rise toward the latter, and a perforated plate is interposed between the holder and journal to permit the spring-pressure to squeeze the lubricant through the perforations, about which projections are provided on the upper surface of the plate to form lubricant-confining spaces and contact with the journal-surface to reduce friction to the minimum.

The more important objects of my present improvement, while retaining all the advantages of the said former construction, are to materially augment the holding capacity for lubricant of the confining spaces therefor on the perforated plate, besides inducing more freely the supply thereto of the lubricant from the cake and confining it more effectively in the spaces against dislodgment, and incidentally to protect from wear the journal-contacting parts of the perforated plate.

Figure 1:
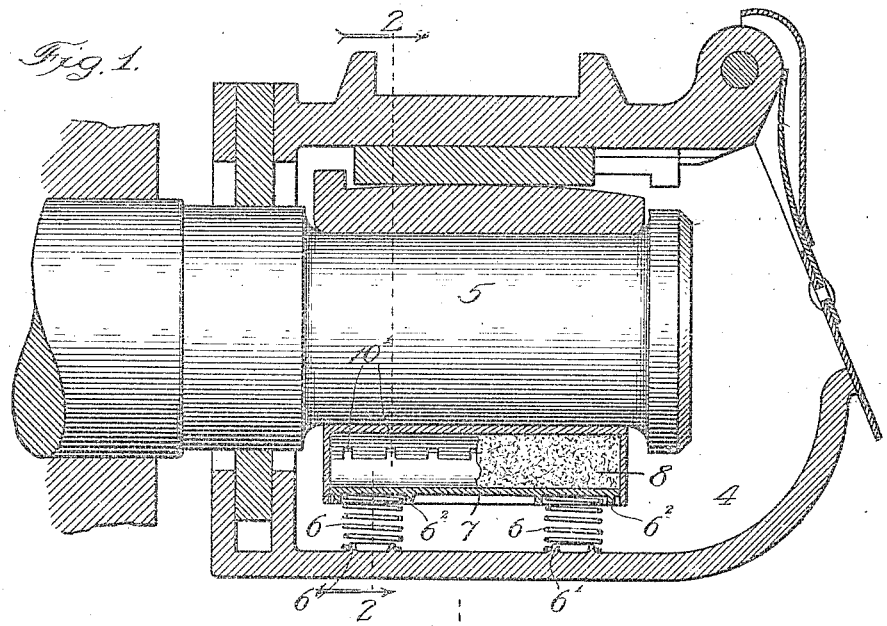
Figure 2:
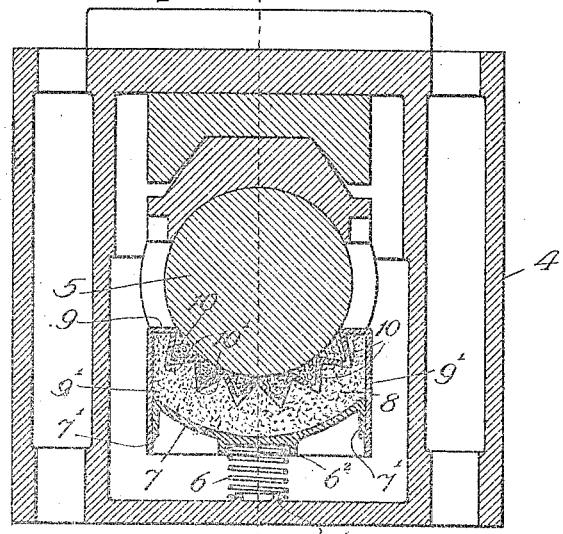
Figure 3:
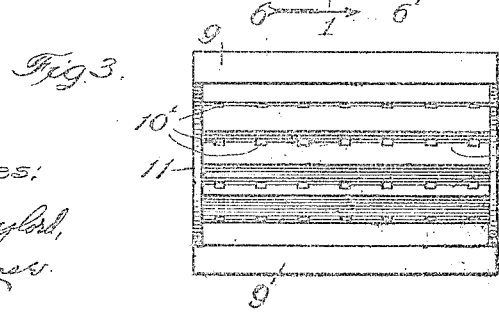

In the accompanying drawing, Figure 1 is a view in longitudinal sectional elevation of a journal-box provided with my improvement, the section being taken on line 1, Fig. 2; Fig. 2 is a section on the irregular line 2—2, Fig. 1, and Fig. 3 is a plan view of the perforated plate.

The journal-box 4 and journal 5 therein may be of ordinary or any suitable construction, with seats 6' formed on the bottom of the box for the lower ends of two spiral springs 6, 6, the upper ends of which are confined in seats 6² on the bottom of a follower-plate 7, shown of dished shape and provided with depending guide-flanges 7' on its lateral edges, this plate forming the spring-supported holder for the lubricating grease 8. A perforated plate 9, which seats upon the cake 8, is of concavo-convex form and provided with depending guide-flanges 9' to overlap the holder 7, substantially as in the aforesaid patent. In the present case, however, the plate 9 is formed with a series of longitudinal corrugations, of the preferred V-shape in cross-section illustrated, producing trough-shaped chambers 10 extending parallel with each other throughout the length of the plate with lines of perforations 10' in their lower apexes and the upper apexes forming the lines of contact with the journal-surface to which the plate conforms. End-walls 11, 11 connect the depending flanges 9' and close the ends of the grease-chambers 10 and conform to the cross-sectional shape of the plate, reaching to the upper apexes, of the corrugations whereby the journal bears also against them and they prevent the grease from getting out of the chambers at their ends and being wasted by dropping into the journal-box.

The entire plate 9, with its depending side-walls 9' and end-walls 11, may be cast as a whole of suitable metal, such as brass, or the upper-end or bearing portions of the walls 11 may be formed of Babbitt metal, molded into place.

As will be seen, the capacity of the chambers 10, by extending lengthwise throughout the plate, is greatly increased, causing them to present always an abundant quantity of grease to the journal when supplied through the perforations 10' from the cake 8, into which the bases of the troughs project by penetration under the force of the spring-pressure against the cake, thereby inducing the constant filling from the latter of the plate-chambers.

What I claim as new and desire to secure by Letters Patent is:—

1. In combination with a journal, a journal-box, and a lubricant device comprising a lubricant-holder spring-supported to extend in the box below the journal and tend to rise toward it, and a longitudinally-corrugated plate, forming a series of trough-shaped lubricant-chambers provided with openings in their bases, interposed between said holder and journal to bear at the open bases against the lubricant and contact along their upper edges with the journal.

2. In combination with a journal, a journal-box and a lubricant-device comprising a lubricant-holder spring-supported to extend in the box below the journal and tend to rise toward it, and a longitudinally-corrugated plate, forming a series of trough-shaped lubricant-chambers provided with rows of perforations in their bases, interposed between said holder and journal to bear at the perforated bases against the lubricant and contact along their upper edges with the journal.

3. In combination with a journal, a journal-box and a lubricant-device comprising a lubricant-holder spring-supported to extend in the box below the journal and tend to rise toward it, and a plate formed with a series of longitudinal corrugations of V-shape in cross-section, forming trough-shaped lubricant-chambers having rows of perforations in their bases, interposed between said holder and journal to bear at said bases against the lubricant and contact along their upper apexes with the journal.

4. In combination with a journal, a journal-box and a lubricant-device comprising a lubricant-holder spring-supported to extend in the box below the journal and tend to rise toward it, and a longitudinally-corrugated concavo-convex plate, forming a series of trough-shaped lubricant-chambers having rows of perforations in their bases, interposed between said holder and journal to bear at said bases against the lubricant and contact along their upper edges with the journal, and provided with walls closing the ends of said chambers and forming bearings for said journal.

5. In combination with a journal, a journal-box and a lubricant-device comprising a lubricant-holder spring-supported to extend in the box below the journal and tend to rise toward it, and a concavo-convex plate formed with a series of longitudinal corrugations of V-shape in cross-section, forming trough-shaped lubricant-chambers provided with rows of perforations in their bases, said plate having depending side-walls and end-walls closing the ends of said chambers and forming bearings for said journal.

FREDERICK LOEDIGE.

In presence of—
NELLIE B. DEARBORN,
RALPH SCHAEFER.